United States Patent [19]

Werner

[11] Patent Number: 5,026,161

[45] Date of Patent: Jun. 25, 1991

[54] FIBER-OPTIC GYROSCOPE WITH REDUCED BIAS DRIFT ERROR CAUSED BY OPTICAL BACK REFLECTIONS

[75] Inventor: Walter V. Werner, Caldwell, N.J.

[73] Assignee: Allied-Signal Inc., Morris Township, Morris County, N.J.

[21] Appl. No.: 437,855

[22] Filed: Nov. 17, 1989

[51] Int. Cl.$^5$ .............................................. G01B 9/02
[52] U.S. Cl. ................................................... 356/350
[58] Field of Search ......................................... 356/350

[56] References Cited

U.S. PATENT DOCUMENTS

| | | | |
|---|---|---|---|
| 4,265,541 | 5/1981 | Leclerc et al. | 356/350 |
| 4,400,088 | 8/1983 | Schiffner | 356/350 |
| 4,915,503 | 4/1990 | Pavlath | 356/350 |

Primary Examiner—Vincent P. McGraw
Attorney, Agent, or Firm—Howard G. Massung; Robert A. Walsh

[57] ABSTRACT

Bias drift error caused by optical back-reflections of clockwise and counterclockwise rotating beams in an integrated optic fiber-optic gyro and originating at a chip/coil interface are reduced by using a chip architecture designed so that the pathlength over which one of the beams is transmitted before being coupled into a fiber-optic coil and the pathlength over which the other beam is transmitted are different. The difference is provided by bending a waveguide transmitting the one beam, with said bending being enhanced by the application of the Titanium Indiffused Proton Exchange process.

9 Claims, 2 Drawing Sheets

FIBER-OPTIC GYROSCOPE WITH REDUCED BIAS DRIFT ERROR CAUSED BY OPTICAL BACK REFLECTIONS

BACKGROUND OF THE INVENTION

This invention relates generally to fiber-optic gyroscopes (gyros) and particularly to a fiber-optic gyro configuration which reduces bias drift error caused by optical back reflections originating at an integrated optic chip/fiber coil interface.

Conventional integrated optic (IO) fiber-optic gyros feature a configuration which includes light from a suitable light source which is transmitted through a directional coupler and then through a polarizer. A tuneable directional coupler splits the light from the polarizer into clockwise and counterclockwise propagating light beams. The light beams are transmitted a particular distance in an IO chip before being coupled into a fiberoptic coil. Back reflections at the chip/coil interface cause a bias drift error which deteriorates gyro performance.

It has been suggested that the I/O chip which may be, for example, of lithium niobate, be angled at the chip/coil interface to reduce the magnitude of the back reflections. Although the idea of an angled interface has been found to dramatically reduce the magnitude of the back reflections and hence improve the bias drift error resulting therefrom, the fabrication of an angled interface is difficult.

The present invention teaches reducing the aforenoted bias drift error by using an IO chip architecture, whereby the distances over which the clockwise and counterclockwise beams are transmitted differs. In the preferred embodiment of the invention this difference is achieved by bending the waveguide over which one of the clockwise and counterclockwise beams is transmitted.

Thus, it is the object of the present invention to provide an integrated optic fiber-optic gyro wherein the chip architecture uses specifically configured waveguides for reducing back reflections causing bias drift error.

SUMMARY OF THE INVENTION

This invention contemplates an integrated optic fiber-optic gyro using clockwise and counterclockwise propagating light beams whereby bias drift error caused by optical back reflections at the integrated optic chip/fiber-optic coil interface is reduced through a chip architecture using a bent waveguide for transmitting one of the beams. Waveguide bend angles in the order of fifteen degrees with low bending losses are achieved using integrated optic waveguide fabrication involving Titanium Indiffused Proton Exchange (TIPE). TIPE, which features the diffusion of extra titanium into the interior portion of a waveguide permits relatively large waveguide bends with low losses. Thus, by bending one of the waveguides, relatively large differences between the pathlengths for the clockwise and counterclockwise beams are achieved without requiring an increase in the overall length of the IO chip to reduce the aforenoted bias drift error.

DETAILED DESCRIPTION OF THE INVENTION

Figure 1:
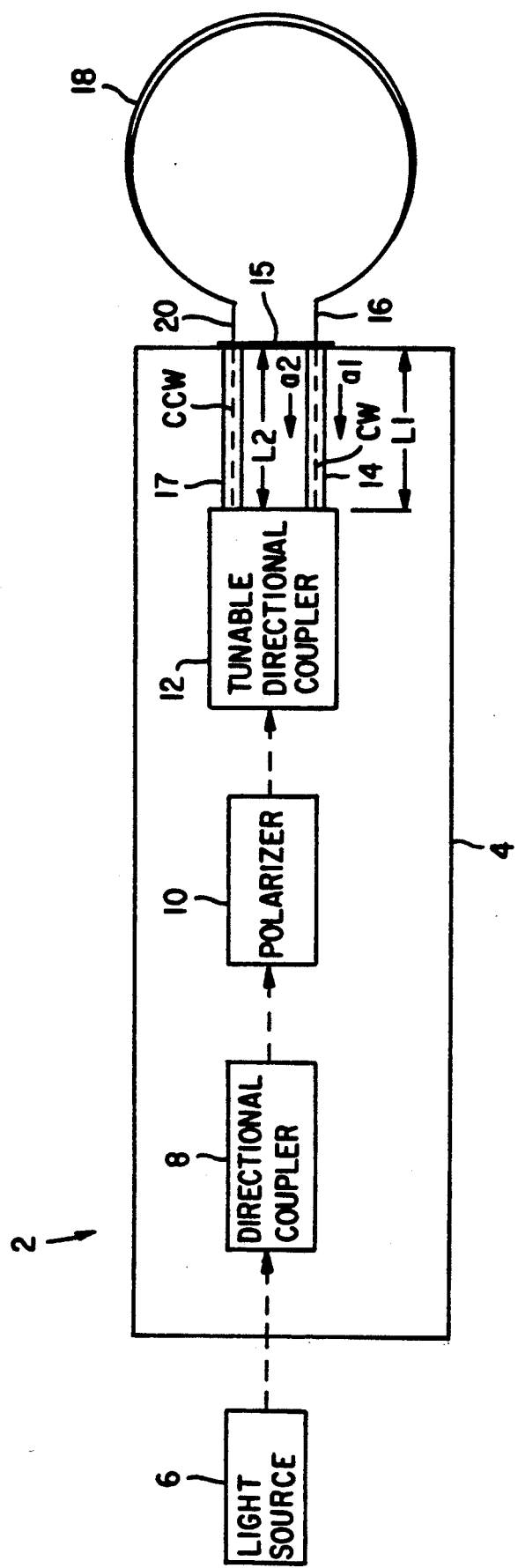
FIG. 1 is a schematic diagram showing a typical prior art IO fiber-optic gyro configuration.

With reference to FIG. 1, a prior art integrated optic (IO) fiber-optic gyro is designated generally by the numeral 2. Fiber-optic gyro 2 is of the type employing an integrated optic chip 4 as is well known in the art. Only as much of gyro 2 will be illustrated and explained as is necessary for purposes of understanding the invention herein disclosed.

A light source 6, which may be a superluminescent diode, provides a light beam which is transmitted through a directional coupler 8 and then through a polarizer 10. The light from polarizer 10 is transmitted through a tuneable directional coupler 12 which splits the light beam from polarizer 10 into a clockwise rotating light beam (CW) and a counterclockwise rotating light beam (CCW).

Light beam CW is transmitted from coupler 12 through a waveguide 14 a distance L1 before being coupled at a chip/coil end or interface 15 to a tail 16 of a fiberoptic coil 18. Counterclockwise beam CCW is transmitted from coupler 12 through a waveguide 17 a distance L2 before being coupled via interface 15 to a tail 20 of fiber-optic coil 18. In prior art gyros distances L1 and L2 are substantially equal.

It will be understood that directional coupler 8, polarizer 10, tuneable directional coupler 12, waveguides 14 and 17 and interface 15 are included in integrated optic chip 4. At interface 15, i.e. where waveguides 14 and 17 interface with fiber-optic coil tails 16 and 20, respectively, a back reflection of beam CW has an amplitude $\alpha 1$ and a back reflection of beam CCW has an amplitude $\alpha 2$. These back reflections cause a bias drift error in the gyro output. The upper boundary of the drift error ($\phi$) can be expressed as follows:

$$\phi = (\alpha 1 \alpha 2 / \alpha^2)(\sin \delta);$$

where $\alpha$ is the amplitude of the light beam passing through polarizer 10 and $\delta$ represents the relative phase between the two arms of a Michelson interferometer formed by the back reflections. In estimating the resulting upper boundaries of the bias drift error caused by this effect, gyro operation at 1300 nm with a 1 Km long fiber wound on a $7.62 \times 10^{-2}$m diameter coil 18 is assumed. For a lithium niobate chip 4 with a straight interface 15, $\alpha 1 \alpha 2 / \alpha^2$ is approximately $0.04^3$. The calculated bias drift error of 6720 degrees per hour is clearly unacceptable for many gyro applications.

It has been found that an effective way of reducing the aforenoted error is to use a chip architecture as will be hereinafter described in substantial detail. Briefly, the chip architecture is such that the path-length difference between L1 and L2 is in the order of 1 mm. The error is reduced considerably if a low coherence light source 6 is used, since the aforenoted back reflections are no longer coherent with each other and do not interfere at interface 15.

Figure 2:
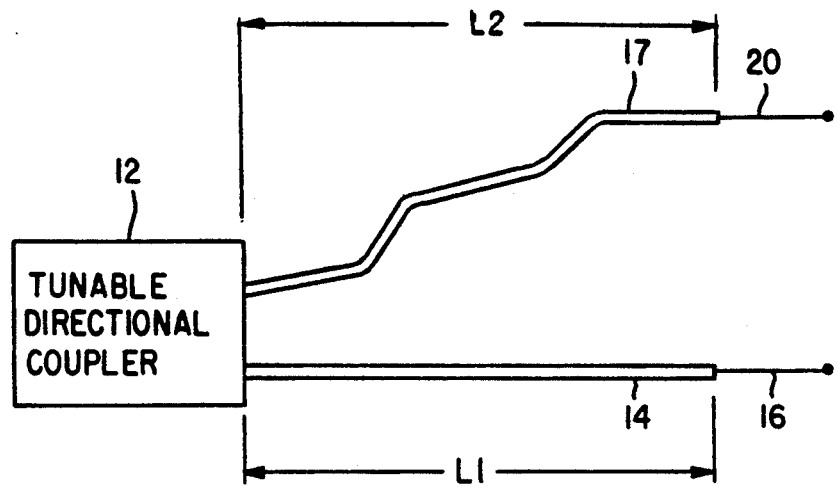
FIG. 2 is a diagrammatic representation illustrating one of the waveguides shown in FIG. 1 as being bent in accordance with the invention.

With particular reference to FIG. 2, the aforenoted pathlength difference is achieved by bending one of the waveguides such as waveguide 17. In this connection it will be understood that waveguide bend angles in the order of fifteen degrees with low bending losses are achieveable due to recent innovations in integrated optic waveguide fabrication. Specifically, Titanium Indiffused Proton Exchange (TIPE), which is a process well known to those skilled in the integrated optic art involves the diffusion of extra titanium in the interior portion of a shaped waveguide and permits relatively large bends with low losses. Thus, Titanium Indiffused Proton Exchange allows the achievement of large pathlength differences without the expense of a large increase in chip length. In this regard it will be understood that chip lengths must be kept short due to packaging constraints and due to the high optical attenuation of lithium niobate. Traditionally, the attainment of a pathlength difference in the order of 1 mm in lithium niobate integrated optic gyros with waveguides provided by titanium indiffusion required very long chip lengths because of the inability to bend the waveguides at angles greater than one degree without sustaining extraordinarily large bending induced propagation losses. In this regard it is noted that the TIPE process is described in the article "Fabrication and Characterization of Titanium Indiffused Proton Exchanged (TIPE) Waveguides In Lithium Niobate" by M. DeMicheli, et al published in *Optics Communications*, Volume 42, No. 2, Pages 101-103, June 15, 1982, the same being incorporated herein by reference.

Figure 3:
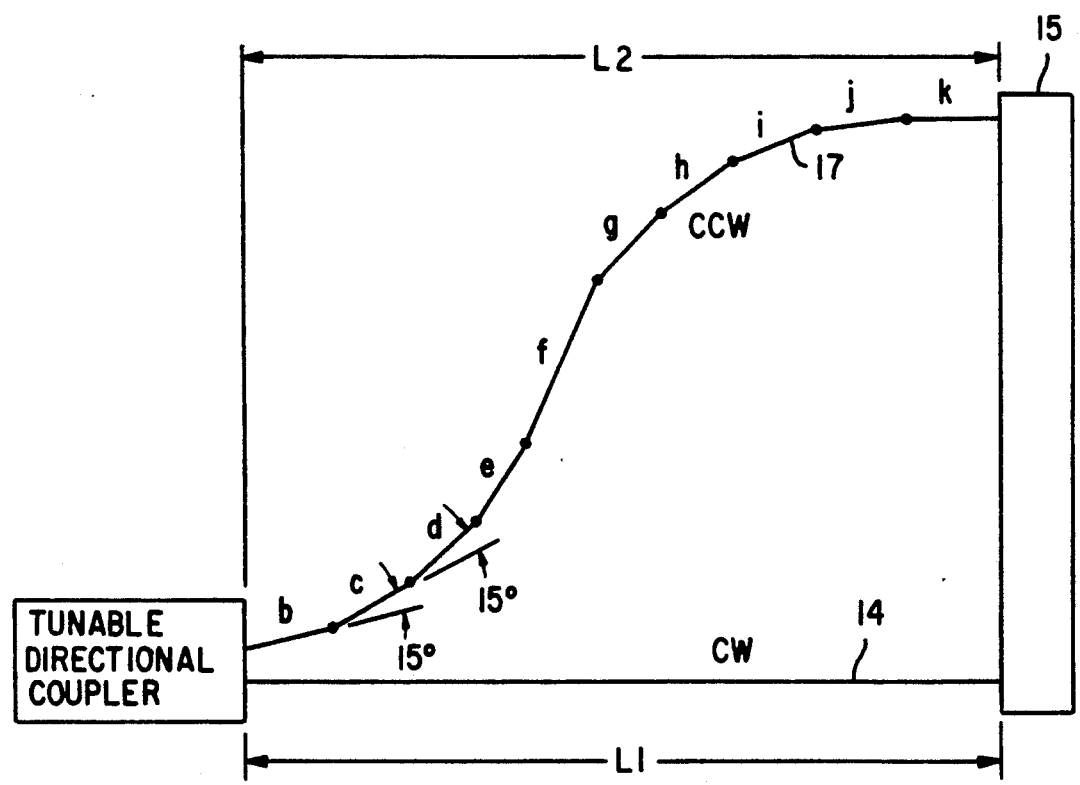
FIG. 3 is a diagrammatic representation showing a particular bent waveguide implementation in accordance with the invention.

With reference to FIG. 3, a particular form of waveguide 17 through which counterclockwise beam CCW is transmitted is illustrated. Thus, waveguide 14 through which beam CW is transmitted is a straight waveguide providing a pathlength L1 which is, for example, 4.5 mm long. Waveguide 17 through which beam CCW is transmitted is bent in a configuration including nine 0.5 mm long segments b, c, d, e, g, h, i, j and k, and one 1.0 mm long segment f providing a pathlength L2 of, for example, 5.5 mm. The ten segments are bent at an angle of fifteen degrees relative to one another. Hence the difference between pathlengths L1 and L2 is 1 mm. This difference significantly reduce the aforenoted back reflection error, as is desirable.

In calculating the reduction of the back reflection achieved error via the invention as heretofore described, it is noted that the coherence function $v(\Delta 1)$ due to the pathlength mismatch $\Delta 1$ replaces the time average of sin $\delta$ in the aforegoing equation for error $\phi$. Thus, the coherence function is written as:

$$v(\Delta 1) = exp.(-1/LC);$$

where LC is the coherence length of the source/waveguide combination. For a source spectral width of 15 nm, $LC = (1300 \text{ nm})^2/15 \text{ nm}(2.15) = 52.4 \mu m$. Using a $\Delta 1$ of 1 mm, the coherence function equals $5.2 \times 10^{-9}$. The resulting bias drift error, with straight I/O chip 4 end faces, and $\Delta 1 = 1$ mm, is only $3.5 \times 10^{-5}$ degrees per hour.

Finally, the use of tuneable directional coupler 12 is important for the disclosed configuration. Because of the pathlength mismatch $\Delta 1$, one of the counterpropagating light beams experiences an increase in attenuation because of its longer pathlength. The coupler splitting ratio must, therefore, be tuned away from the 50/50 splitting to equalize the optical power of each beam transmitted to the fiber coil and to thereby achieve maximum Kerr bias reduction.

It is noted that a gyro as shown and explained can be operated in either a closed loop or open loop configuration.

There has thus been described a fiber-optic gyro featuring an integrated optic chip architecture that specifically uses a bent waveguide. Although waveguide 17 over which counterclockwise beam CCW is transmitted has been shown as bent, waveguide 14 over which clockwise beam CW is transmitted may be bent instead. The bent waveguide configuration achieved with the aforementioned TIPE waveguide fabrication process significantly reduces the back reflection error without having to angle the lithium niobate end face, and thus avoids the ensuing fabrication difficulty. Hence, in an integrated optic fiber-optic gyro configuration bias drift error is reduced in a desirable manner.

It will be understood that the particular implementation illustrated and described with reference to FIG. 3 is by way of example only and not by way of limitation. Thus, more or less segments b - k at greater or less lengths and bent at greater or lesser angles relative to each other for achieving a required pathlength difference may be used.

With the aforenoted description of the invention in mind reference is made to the claims appended hereto for a definition of the scope of the invention.

What is claimed is:

1. A fiber-optic gyroscope, comprising:
   a light source for transmitting a light beam;
   a fiber-optic coil having first and second ends;
   means disposed between the light source and the first and second coil ends including means for receiving the light beam, means for splitting the received light beam into first and second counterpropagating light beams, means for interfacing with two ends of the fiber-optic coil, first means for providing a first path for the first counterpropagating light beam between the beam splitting means and the interface means, and second means for providing a second path for the second counterpropagating light beam between the beam splitting means and the interface means;
   the paths provided by the first and second path providing means differing in length whereby optical back reflections at the interface means are reduced for reducing gyroscope bias drift error;
   the difference in the lengths of the paths provided by the first and second path providing means being provided by bending one of the first and second path providing means, whereby optical back reflections at the interface means are reduced for reducing gyroscope bias drift error without increasing the length of the means disposed between the light source and the first and second coil ends; and
   the one of the first and second path providing means being bent to provide a plurality of segments, each of which is of a discrete length and is at a discrete angle, so as to provide a predetermined path length.

2. A fiber-optic gyroscope as described by claim 1, wherein:
   the beam splitting means is a tuneable directional coupler, whereby the first and second beams are turned to equalize the optical power of each of said beams at the interface means.

3. A fiber-optic gyroscope as described by claim 1, wherein:

the light source is a low coherence light source whereby the coherence of the optical back reflections is minimized to minimize interference thereof at the interfacing means.

4. A fiber-optic gyroscope, comprising:

a light source for transmitting a light beam;

a fiber-optic coil having first and second ends;

an integrated optics chip disposed between the light source and the first and second ends including means for receiving the light beam, means for splitting the received light beam into first and second counterpropagating light beams, means for interfacing with the two ends of the fiber-optic coil, first means for providing a first path for the first counterpropagating light beam between the beam splitting means and the interface means, and second means for providing a second path for the second counterpropagating light beam between the beam splitting means and the interface means;

one of the first and second means being straight;

the other of the first and second means being bent into a plurality of segments, each of which is of a discrete length and is bent at a discrete angle, so that the path provided thereby is longer than the path provided by the one of said means; and the difference in the length of the paths tending to reduce optical back reflections at the interface means for reducing gyroscope bias drift error without increasing the length of the integrated optics chip.

5. A fiber-optic gyroscope as described by claim 4, wherein:

the beam splitting means is a tuneable directional coupler, whereby the first and second beams are tuned to equalize the optical power of each of said beams at the interface means.

6. A fiber-topic gyroscope as described by claim 4, wherein:

the light source is a low coherence light source whereby the coherence of the optical back reflections is minimized to minimize interference thereof at the interfacing means.

7. A method for providing a fiberoptic gyroscope, comprising:

providing a light source for transmitting a light beam;

providing a fiber-optic coil having first and second ends;

disposing an integrated optics chip between the light source and the first and second coil ends for receiving the light beam, splitting the received light beam into first and second counterpropagating light beams, providing a first path for the first counterpropagating light beam and a second path for the second couinterpropagating light beam, and interfacing the first path with the first coil end and the second path with the second coil end; and bending one of the first and second paths so that the one path is longer than the other of said paths, whereby the difference in the length of the paths tends to reduce optical back reflections upon said interfacing for reducing gyroscope bias drift error without increasing the length of the integrated optics chip including bending the one of the first and second paths into segments, each of which segment is of a discrete length and is at a discrete angle.

8. A method for making a fiber-optic gyroscope as described by claim 7, including:

tuning the first and second counterpropagating light beams for equalizing the optical power of the beams at interfacing.

9. A method for making a fiber-optic gyroscope as described by claim 7, including:

providing a low coherence light source whereby the coherence of the optical back reflections is minimized for minimizing interference thereof at interfacing.

* * * * *